United States Patent
Gurley et al.

(10) Patent No.: US 7,539,142 B1
(45) Date of Patent: May 26, 2009

(54) ETHERNET LAN INTERFACE FOR T3 NETWORK

(75) Inventors: Jason Gurley, Huntsville, AL (US); Clarke Edgar Moore, Huntsville, AL (US); Timothy James Schlichter, Owens Crossroads, AL (US)

(73) Assignee: Adtran, Inc., Huntsville, AL (US)

( * ) Notice: Subject to any disclaimer, the term of this patent is extended or adjusted under 35 U.S.C. 154(b) by 879 days.

(21) Appl. No.: 10/896,214

(22) Filed: Jul. 21, 2004

(51) Int. Cl.
*H04L 12/54* (2006.01)
(52) U.S. Cl. .................................... 370/235; 370/428
(58) Field of Classification Search ................ 370/229, 370/231, 235, 236, 237, 395, 397, 410, 412, 370/437, 428
See application file for complete search history.

(56) References Cited

U.S. PATENT DOCUMENTS

| | | | | |
|---|---|---|---|---|
| 4,727,537 A | * | 2/1988 | Nichols | 370/236 |
| 5,629,928 A | * | 5/1997 | Calvignac et al. | 370/237 |
| 5,742,600 A | * | 4/1998 | Nishihara | 370/395.6 |
| 5,940,369 A | * | 8/1999 | Bhagavath et al. | 370/229 |
| 5,995,486 A | * | 11/1999 | Iliadis | 370/229 |
| 6,181,704 B1 | * | 1/2001 | Drottar et al. | 370/410 |
| 6,618,378 B1 | * | 9/2003 | Giroux et al. | 370/395.1 |
| 2003/0156542 A1 | * | 8/2003 | Connor | 370/236 |
| 2004/0114607 A1 | * | 6/2004 | Shay et al. | 370/395.42 |

OTHER PUBLICATIONS

RAD Data Communications, Ltd., RIC-E3/ETH. RIC-T3/ETH, 10, 100BaseT to E3/T3 Interface Converters, Article 0,6583,17861,00.
E3Switch Corporation, High-Speed 100 BaseTX to E3/T3/STS-1 Converter.

* cited by examiner

*Primary Examiner*—Kwang B Yao
*Assistant Examiner*—Andrew Lai
(74) *Attorney, Agent, or Firm*—Allen, Dyer, Doppelt, Milbrath & Gilchrist, P.A.

(57) ABSTRACT

A differential time domain digital communication bridge module interfaces 100 Mbps Ethernet traffic with a T3 communication link, using a relatively small sized data buffer. To avoid dropping packets, the relatively large sized buffer in the Ethernet switch is used to temporarily store packets, in when an upper threshold of the storage capacity of the buffer is reached. The upper threshold leaves enough storage overhead in the buffer to allow the Ethernet switch to complete its current transmission of a maximum length packet. When a lower threshold is reached a 'resume transmission' packet is sent to the switch. The lower threshold provides sufficient buffer space to allow the T3 transmitter to read out the contents of the buffer without underflow.

14 Claims, 3 Drawing Sheets

ETHERNET LAN INTERFACE FOR T3 NETWORK

FIELD OF THE INVENTION

The present invention relates in general to telecommunication systems and subsystems thereof, and is particularly directed to an efficient storage capacity, differentially clocked buffer-based digital communication mechanism for interfacing a first time domain over which a relatively high clock rate sequential data stream, such as a 100 MHz data stream supplied by an Ethernet-based local area network (LAN) is transported, with a relatively low time domain having a digital communication link, operating at a relatively lower clock rate, such as a T3 communication link operating at 44.736 MHz, and for interfacing a T3 rate data stream received from the T3 link with the higher data rate Ethernet-based local area network.

BACKGROUND OF THE INVENTION

There are a variety of digital communication networks wherein a main office or facility desires to conduct internet protocol-based communications with a branch office. Where this is effected using a T3 communication link, Ethernet local area networks at the respective offices may be required to connect with a T3 service unit (T3SU) by way of an expensive router using high speed serial interface (HSSI) protocol. It would be preferable for the customer to have the ability to couple the Ethernet LAN interface directly with the T3SU. A first problem in doing so is the fact that the Ethernet LAN operates at a first clock rate (e.g., 100 MHz) that is different from (higher than) and not synchronized with the T3 clock (44.736 MHz), making it necessary to provide some form of buffer interface between the two different clock domains.

A second issue is the fact that the size of the buffer is limited by practical considerations including semiconductor real estate availability, latency and cost—resulting in a buffer size that cannot accommodate more than just a few maximum length packets (e.g., packets on the order of 1.5 Kbytes (1536 bytes) long). This latter factor can be problematic where employed in programs such as Windows type file transfer protocol (FTP) programs, which entail relatively large file transfers, and may cause the limited capacity buffer to overflow, so that packets are dropped. Unfortunately, Windows type FTP programs do not readily recover from dropped packets, and TCP windowing, that would normally slow down the transfer rate until a maximum sustained transfer rate is realized, may fail—causing a further slowing down of the transfer rate and even stalls.

SUMMARY OF THE INVENTION

In accordance with the present invention, these problems are successfully addressed by a differential time domain interface, which is operates as a differentially clocked, efficient storage capacity buffer-based digital communication bridge module. As will be described, the differential time domain bridge module of the invention comprises full duplex transceivers and associated buffer components that are operative to interface a relatively high clock rate sequential data stream, such as a 100 MHz packet stream supplied by an Ethernet-based local area network (LAN), with a digital communication link operating at a relatively lower clock rate, such as a T3 communication link operating at 44.736 Hz. The bridge module is further operative to interface a T3 rate data stream received from the T3 link with the higher data rate Ethernet-based local area network.

By efficient storage capacity is meant relatively small buffer sizes, one buffer being sized to store up to only a few maximum length packets in the Ethernet LAN-to-T3 transport direction, and the other buffer being sized to store only slightly more than a single maximum length packet in the T3-to-Ethernet LAN transport direction. For a maximum packet length being on the order of 1500 bytes (1536 bytes), and with the ability to store packets in the internal 256 Kbyte buffer of the Ethernet switch, in the Ethernet LAN-to-T3 transport direction, the storage capacity of the bridge module FIFO may be on the order of four times the maximum size of a data packet that may be sourced from a customer DTE, or a 6 K (6144 bytes) buffer.

This times-four buffer size parameter serves to accommodate various packet communication parameters that may be encountered, including providing an opportunity for the bridge module's T3 transmitter to complete clocking out of an already stored maximum length packet from the FIFO at the T3 clock rate (which is less than half of the clock rate of transmissions over a media independent interface (MII) bus), the completion of the transmission in progress of a maximum length packet over the MII bus by an MII transmitter, before it is allowed to transmit a 'pause' packet, and completion of the transmission in progress of a packet from the Ethernet switch to the bridge module's MII receiver and storage thereof in its associated FIFO, before the Ethernet switch ceases transmitting new packets.

In the T3-Ethernet transport direction, on the other hand, the storage capacity of a bridge module's T3-Ethernet FIFO need be only somewhat larger than a maximum size packet. This serves to provide sufficient margin for the storage of a maximum length (1536 bytes) data packet. To readily accommodate these parameters, the T3-Ethernet FIFO may comprise a 2 K buffer (having a storage capacity on the order of 2048 bytes). This means that the combined memory of the bridge module is only on the order of 8 Kbytes (8192 bytes), which limits the amount of semiconductor real estate required to implement on-board memory to a relatively small area, thereby reducing the cost of the bridge module.

The invention's ability to employ a relatively small sized buffer in the Ethernet LAN-to-T3 direction without causing packets to be dropped results from taking advantage of the relatively large sized buffer contained in the Ethernet switch that serves as the source of the packets. Pursuant to the data flow control aspect of the invention, the storage occupancy of the limited capacity Ethernet-to-T3 buffer is continually monitored by the bridge module's communications control logic and compared to upper and lower threshold values, respectively representative of a first prescribed fraction (e.g., three-quarters or 4608 bytes) of the (6144 byte) storage capacity of the FIFO and a second prescribed fraction (e.g., one-quarter or 1536 bytes) of the storage capacity of the FIFO. Setting the upper threshold equal to three-quarters of the 6 K storage capacity of the Ethernet-T3 FIFO buffer leaves enough room in the buffer to capture a single maximum length packet from the Ethernet switch, so as to allow the Ethernet switch to complete its current transmission of a packet of up to 1536 bytes in length.

Setting the lower threshold at one-quarter of the 6K storage capacity of the Ethernet-T3 FIFO buffer provides sufficient memory to allow the T3 transmitter to read out the contents of the memory without underflow (gaps in the data), as the Ethernet switch transmits the next packet to be buffered in the 6 K FIFO. The 6 K FIFO will store a new packet at the Ethernet data rate, while being read out at the T3 rate.

As long as the amount of data stored in the 6K Ethernet-T3 FIFO is less than the upper threshold level, the bridge module's MII receiver will continue to write packets into the FIFO as they are received from the Ethernet switch. If the upper threshold level is reached, however, the bridge module's MII transmitter will wait a prescribed inter-packet gap (e.g., 96 bytes) following the completion of transmission of any packet it is currently sending to the Ethernet switch, and then will transmit a relatively short 'pause' packet (64 bytes) over the MII bus to the Ethernet switch.

A 'pause' packet is used to interrupt transmission of packets of the MII transmit bus by the Ethernet switch, until either the expiration of a length of time specified in the pause packet, or a subsequent 'terminate pause' packet is received from the bridge module's MII transmitter. A 'terminate pause' packet is the same as a 'pause' packet, except that the pause interval data field is set to zero. When the Ethernet switch interrupts transmission of packets to the bridge module, the packet or packets that it would otherwise transmit to the bridge module buffer up inside of Ethernet switch's 256 K buffer. Because of its relatively large storage capacity (256 Kbytes compared to the 6 Kbyte storage capacity of the bridge module's transmit buffer), the Ethernet switch's internal memory is readily able to handle packets that the switch would otherwise be transmitting to the bridge module during a maximum length pause interval. This allows the contents of the limited capacity Ethernet-to-T3 buffer to be read out over the T3 link without writing any new packets into the buffer, thereby reducing the data occupancy level of the Ethernet-to-T3 buffer.

The lower threshold of the data occupancy level of the Ethernet-T3 buffer is used by the bridge module's communications control logic to terminate interruption of data flow from the Ethernet switch. Namely, once transmission of packets from the Ethernet switch to the bridge module is interrupted, data stored in the 6 K Ethernet-T3 buffer will continue to be clocked out by the T3 transmitter, but no new data will be received and written to the buffer by the MII receiver, since that data is temporarily buffered in the Ethernet switch's internal 256 Kbyte memory. As data is clocked out of the Ethernet-T3 buffer, the contents of the Ethernet-T3 buffer eventually reach the lower threshold. When this happens, the bridge module's communications control logic causes the MII transmitter to transmit a 'terminate pause' packet, so that data flow from the Ethernet switch to the T3 network may resume.

To write packets into and read packets from the Ethernet LAN-T3 circular FIFO 6 K buffer, the bridge module employs a write pointer that points to the location in the buffer into which new data as received by the bridge module's MII receiver is being written (at a 100 MHz clock rate), while a read pointer points to that location in the 6 K buffer from which previously stored data is being clocked out (at a 44.736 MHz clock rate) for transmission by the bridge module's T3 transmitter. In addition, there is a 'last known good' (LKG) pointer, which points to the last byte of the most recently received complete packet.

Because the write pointer is incremented at a considerably higher rate than the read pointer, the read pointer is used to immediately clock out data as it is received and written into the buffer by the MII receiver.

Moreover, since the write pointer is incremented at the 100.MHz clock rate of the MII bus, which is more than twice the clock rate (44.736 Mbps) at which data is read out by the T3 transmitter, and because of the need to wait until completion of transmission of packets by the MII transmitter and the Ethernet switch before a pause message may be transmitted, there is a possibility for the write pointer to 'lap' the read pointer. If this were to happen, data of a previously stored packet yet to be read out would be overwritten by data of a newly received packet—a situation which would invalidate the packet being read out. To prevent this occurrence, the 'last known good' (LKG) pointer is employed. As noted above, the LKG pointer points to the last byte of the most recently received complete packet. This pointer is used whenever the write pointer reaches the read pointer.

In this event, the write pointer is immediately backed up to that Ethernet-T3 buffer address pointed to by the LKG pointer and the packet being written into the buffer is dropped, since it is only partial and therefor invalid. (Retransmission of the dropped packet is handled by an upper layer data transport protocol.) The read pointer will eventually point to the same address by the LKG pointer. Upon being incremented to the next address the read pointer will point to the first address of the next received packet, following the packet that was dropped.

The manner in which the upper (three-quarters) and lower (one-quarter) thresholds of the Ethernet-T3 buffer are calculated depends upon the locations of the write and read pointers relative to one another. Where the address pointed to by the write pointer 'leads' the address pointed to by the read pointer, a one-quarter full threshold is calculated by comparing the difference between the addresses of the two pointers with a value equal to one-fourth the size of the FIFO. For the same condition, the three-quarter full threshold is identified by comparing the difference between the addresses of the two pointers with a value equal to three-fourths the size of the FIFO which.

Where the address pointed to by the write pointer 'lags' the address pointed to by the read pointer. The one-quarter full threshold is calculated by comparing the sum of the write pointer and the FIFO size, less the value of the read pointer, with a value equal to one-fourth the size of the FIFO. Similarly, a three-quarters full threshold is identified by comparing the sum of the write pointer and the FIFO size, less the value of the read pointer, with a value equal to three-fourths the size of the FIFO.

The size of the buffer used for T3-to-Ethernet packet communications is only slightly larger than the maximum length of a packet, since the read out data rate in this direction (e.g., 100 Mbps) is more than twice the write in data rate (e.g., 44.736 Mbps). In this direction, once a complete packet has been written into the T3-to-Ethernet. buffer, a 'valid' flag is asserted, so that the packet may be immediately read out and transported over the MII bus to the Ethernet switch. Namely, the MII transmitter waits until a complete packet is received and stored in the T3-Ethernet 2 K buffer, before it begins reading data out over the MII bus, in order to avoid a buffer underflow condition. The MII transmitter transmits one packet at a time, and once it begins transmission of a packet to the Ethernet switch, it is not interrupted.

When the bridge modules T3 receiver writes a packet into the T3-Ethernet 2 K buffer, it begins writing a packet into an address location two, relative to the address of the last byte of the previous packet. Once a complete packet has been written into the buffer, the receiver writes the address of the last byte of the packet in the first two bytes of the received packet. Address byte 1 is used to write the least significant eight bits (0-7) of the packet's eleven bit terminal byte address, while the four least significant bits of address byte 0 are used to store bits 8-11 of the address. The most significant bit of address byte 0 is used as a valid bit and is set at a '1', once a complete packet has been written into the buffer. The other bits of address byte zero are not used, don't care bits. The MII transmitter monitors the valid bit for the presence of a '1'.

When the valid bit changes to a '1', the MII transmitter proceeds to read out the packet beginning with the contents of byte two until the last byte the address of which is defined by the eight bits of address 1 and the four least significant bits of address 0. It then proceeds to monitor the valid bit of the equivalent 0th address bit for the next packet that has been written into the buffer.

Due to the bursty nature of the data on the T3 link, for clock synchronization purposes it is necessary to transmit 'dummy' data patterns between packets. These dummy data patterns are implemented by repetitively transmitting a flag byte pattern $7E_{HEX}$ or the code '0111 1110' between data packets. This serves to effectively encapsulate each data packet within a pair of flag bytes. However, this creates the problem of how to distinguish a flag byte from an actual data value having the flag byte pattern. This problem is resolved by stuffing a '0' bit after a run of five consecutive '1' bits in the data stream. Such a bit stuffing operation converts the flag byte pattern '0111 1110' to the pattern '0111 1101 0', thereby ensuring that flag patterns occur only where intended—outside the data stream. In addition to transmitting flag bytes in the absence of data, the invention transmits a '$55_{HEX}$ byte (0101 0101) following a $7E_{HEX}$ byte to define the start of a standard IEEE 802.3 Ethernet frame.

DETAILED DESCRIPTION

Figure 1:
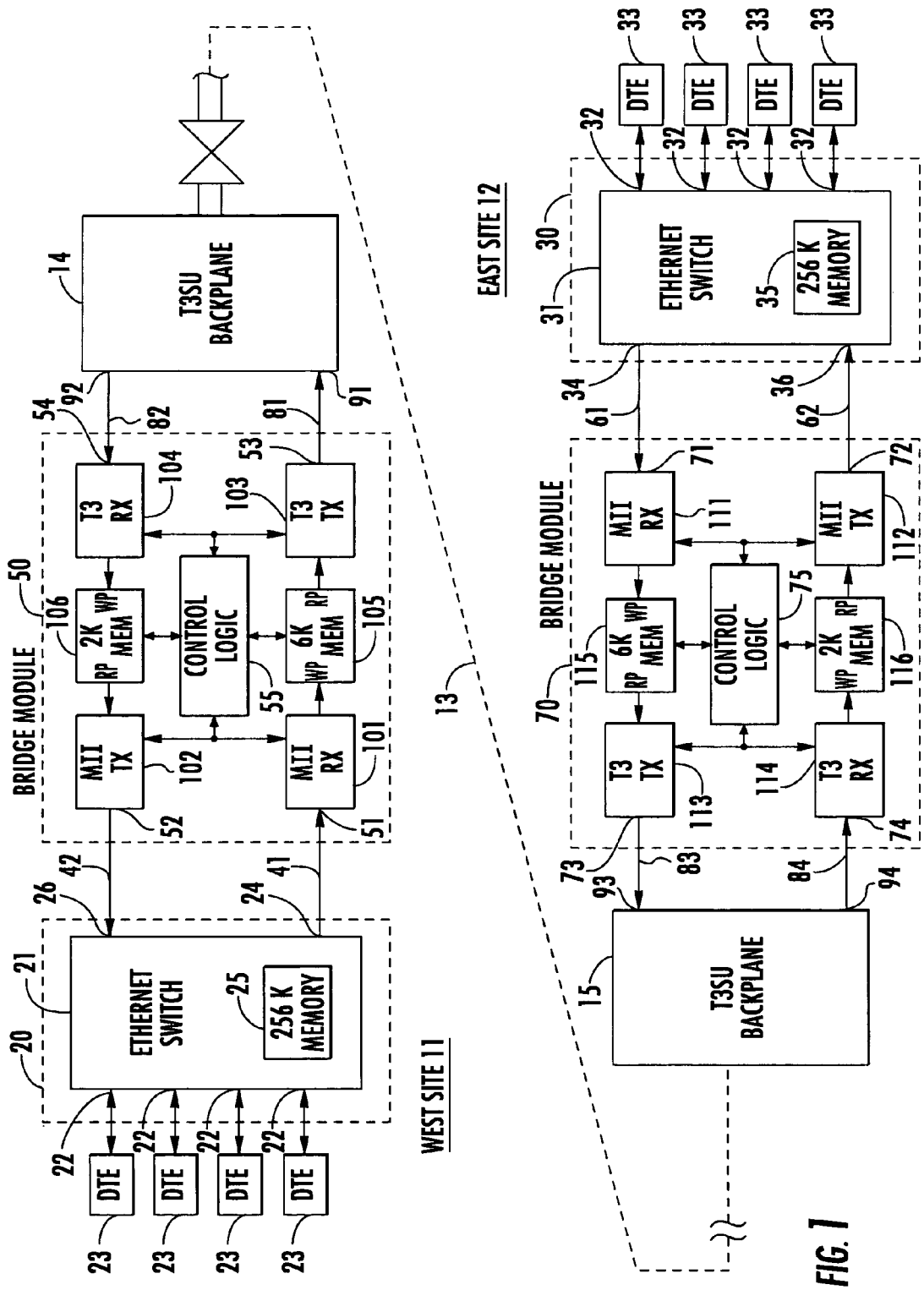
FIG. 1 is a reduced complexity block diagram of the general architecture of a digital telecommunication network in which the differentially clocked, efficient storage capacity buffer-based digital communication interface mechanism of the present invention, in the form of a differential time domain 'bridge' module has been installed.

Before detailing the differentially clocked, efficient storage capacity buffer-based digital communication interface mechanism of the present invention, it should be observed that the invention resides primarily in a prescribed arrangement of conventional digital communication circuits and components and attendant supervisory communications microprocessor circuitry, as well as application software therefor, that controls the operations of such circuits and components. In a practical implementation that facilitates their incorporation into readily commercially available digital telecommunication transceiver equipment, the inventive arrangement is preferably implemented using field programmable gate array (FPGA)-configured, application specific integrated circuit (ASIC) chip sets. In a hardware implementation of such chip sets, digital ASICs are preferred.

Consequently, the configuration of such subsystems and components and the manner in which they may be interfaced with both serial and parallel telecommunication channels have, for the most part, been shown in the drawings by a readily understandable block diagram, and associated buffer diagrams, which show only those specific details that are pertinent to the present invention, so as not to obscure the disclosure with details which will be readily apparent to those skilled in the art having the benefit of the description herein. Thus, the block diagram is primarily intended to show the major components of the invention in convenient functional groupings, whereby the present invention may be more readily understood.

Attention is initially directed to FIG. 1, which is a reduced complexity block diagram of the general architecture of a digital telecommunication network in which the differentially clocked, efficient storage capacity buffer-based digital communication interface mechanism of the present invention, in the form of a differential time domain 'bridge' module has been installed. As a non-limiting example, the network may comprise a T3 communication network 10 operating at a 44.736 Hz clock rate, respective 'west' and 'east' terminal sites 11 and 12 of which are coupled to associated Ethernet protocol-based local area networks (LANs) 20 and 30, operating at a 100 MHz clock rate.

West site 11 contains an Ethernet switch 21, which operates at a relatively high clock rate (on the order of 100 MHz) compared with that of the (T3) network. Ethernet switch 21 has a plurality (e.g., four, as a non-limiting example) of customer equipment ports 22 that are adapted to be coupled to associated customer equipments, such as data terminal equipments (DTEs) 23. Similarly, east site 12 has an Ethernet switch 31, which includes a plurality of customer equipment ports 32 that are adapted to be coupled to associated DTEs 33. In addition to transceiver circuitry, each Ethernet switch includes an internal memory to provide for the buffering of data, as may be required. For this purpose, west site Ethernet switch 20 includes a 256 Kbyte memory 25, while east site Ethernet switch 30 includes a 256 Kbyte memory 35.

The T3 network proper includes a T3 rate communication link 13, which is terminated at its west end by a T3 rate service unit (T3SU) backplane 14, and at its east end by a T3SU backplane 15. In accordance with the invention, each T3 termination site further includes a differentially clocked, digital communication interface, in the form of a four port differential time domain bridge module, that is operative to couple respective transmit and receive network ports of that site's Ethernet switch (operating at a 100 Mbps data rate) with associated receive and transmit ports of an associated T3SU backplane (operating at a 44.736 Mbps data rate).

More particularly, in the LAN-T3 transport direction, west site Ethernet switch 20 has its LAN equipment transmit port 24 coupled by way of a media independent interface (MII) bus 41 to a high clock rate (Ethernet LAN) receive port 51 of a Ethernet-T3 bridge module 50, which effectively operates as a differential time domain interface in accordance with the invention. In the T3-LAN transport direction, Ethernet switch 20 has its LAN equipment receive port 26 coupled by way of an MII bus 42 to a high clock rate (Ethernet LAN) transmit port 52 of the Ethernet-T3 bridge module 50. Similarly, at east site 12, for the LAN-T3 transport direction, Ethernet switch 30 has its LAN equipment transmit port 34 coupled by way of an MII bus 61 to a high clock rate receive port 71 of a Ethernet-T3 bridge module 70, while in the T3-LAN transport direction, Ethernet switch 30 has its LAN equipment receive port 36 coupled by way of a MII bus 62 to a high clock rate transmit port 72 of Ethernet-T3 bridge module 70.

In the LAN-T3 transport direction, west site bridge module 50 has a T3 transmit port 53 coupled by way of a T3-transport link 81 to a receive port 91 of T3SU backplane 14, while in the T3-LAN transport direction, bridge module 50 has a T3 receive port 54 coupled by way of a T3-transport link 82 to a transmit port 92 of T3SU backplane 14. In the LAN-T3 transport direction, east site bridge module 70 has a T3 transmit port 73 coupled by way of a T3-transport link 83 to a receive port 93 of T3SU backplane 15, while in the T3-LAN transport direction, bridge module 70 has a T3 receive port 74 coupled by way of a T3-transport link 84 to a transmit port 94 of T3SU backplane 14.

On the Ethernet switch-coupling side, west site bridge module 50 has its Ethernet LAN receive port 51 coupled to a high clock rate (100 MHz) MII receiver 101, while LAN transmit port 52 is coupled to a high clock rate MII transmitter 102. On the T3-coupling side, the bridge module's T3 transmit port 53 is coupled to a (44.736 Hz) T3 rate transmitter 103, while the T3 receive port 54 is coupled to a T3 rate receiver 104. In the LAN-T3 transport direction, the output of MII receiver 101 is coupled to the write port (WP) of an Ethernet-T3 first-in, first-out (FIFO) circular buffer 105, while the read port (RP) of FIFO 105 is coupled to T3 transmitter 103. In the T3-LAN transport direction, the output of T3 receiver 104 is coupled to the write port of a circular T3-Ethernet FIFO buffer 106, while the read port of Ethernet-T3 buffer 106 is coupled to the MII transmitter 102.

In like manner, for the east site bridge module, the Ethernet switch-coupling side of bridge module 70 has its Ethernet LAN receive port 71 coupled to a high clock rate (100 MHz) MII receiver 111, while LAN transmit port 72 is coupled to a high clock rate MII transmitter 112. On the T3-coupling side, T3 transmit port 73 is coupled to a T3 transmitter 113, while T3 receive port 74 is coupled to a T3 receiver 114. In the LAN-T3 transport direction, the output of MII receiver 111 is coupled to the write port (WP) of a 6 K Ethernet-T3 circular FIFO buffer 115, while the read port (RP) of FIFO 115 is coupled to T3 transmitter 113. In the T3-LAN transport direction, the output of T3 receiver 114 is coupled to the write port of a 2 K T3-Ethernet circular FIFO buffer 116, while the read port of 2 K buffer 116 is coupled to MII transmitter 112.

As described above, in the Ethernet-T3 transport direction, the storage capacity of a bridge module FIFO, such as the west site FIFO 105 of bridge module 50 (or FIFO 115 of east site module 70) is that of only a few maximum size packets (e.g., on the order of four times the maximum size of a data packet) that may be sourced from a customer DTE. This (times-four) limit buffer size parameter serves to accommodate a number of packet communication parameters that may be encountered. These include: the time required for the bridge module's T3 transmitter to complete clocking (reading) out of an already stored maximum length packet from the FIFO at the T3 clock rate (which is less than half of the clock rate of transmissions over the MII bus); the completion of the transmission in progress of a maximum length packet over the MII bus by an MII transmitter before it is allowed to transmit a 'pause' packet; and the completion of the transmission in progress of a packet from the Ethernet switch to the bridge module's MII receiver and storage thereof in its associated FIFO, before the Ethernet switch ceases transmitting new packets. For a maximum packet length being on the order of 1500 bytes (1536 bytes), and with the ability to store packets in the internal 256 K buffer of the Ethernet switch, this means that Ethernet-T3 FIFO 105 is not any larger than a 6 K buffer (having a storage capacity on the order of 6144 bytes).

In the T3-Ethernet transport direction, on the other hand, the storage capacity of a bridge module's T3-Ethernet FIFO need be only somewhat larger than a maximum size packet. This serves to provide sufficient margin for the storage of a maximum length (1536 bytes) data packet.

To readily accommodate these parameters, the T3-Ethernet FIFO may comprise a 2K buffer (having a storage capacity on the order of 2048 bytes). This means that the combined memory of the bridge module is only on the order of 8 Kbytes, which helps in limiting the amount of semiconductor real estate required to implement on-board memory to a relatively small area, thereby reducing the cost of the bridge module.

As noted above, in accordance with the invention, the data occupancy level of the 6 K Ethernet-T3 FIFO buffer is continuously monitored by the bridge module's communications control logic and compared to upper and lower threshold values, respectively representative of a first prescribed fraction (e.g., three-quarters or 4608 bytes) of the (6144 byte) storage capacity of the FIFO and a second prescribed fraction (e.g., one-quarter or 1536 bytes) of the storage capacity of the FIFO. Setting the upper threshold equal to three-quarters of the 6 K storage capacity of the Ethernet-T3 FIFO buffer leaves enough room in the buffer to capture a single maximum length packet from the Ethernet switch, so as to allow the Ethernet switch to complete its current transmission of a packet of up to 1536 bytes in length. Setting the lower threshold at one-quarter of the 6 K storage capacity of the Ethernet-T3 FIFO buffer provides sufficient memory to allow the T3 transmitter to read out the contents of the memory without underflow (gaps in the data), as the Ethernet switch is transmitting the next packet to be buffered in the 6 K FIFO. The 6 K FIFO will store a new packet at the Ethernet data rate, while being read out at the T3 rate.

As long as the amount of data stored in the 6 K Ethernet-T3 FIFO is less than the upper threshold level, the MII receiver will continue to receive and store packets as they are transmitted from Ethernet switch. If the upper threshold level is reached, however, the MII transmitter will wait a prescribed inter-packet gap (e.g., 96 bytes) following the completion of transmission of any packet it is currently sending to the Ethernet switch, and then will transmit a relatively short 'pause' packet (64 bytes) over the MII bus to the Ethernet switch.

As described briefly above, a 'pause' message is effective to cause the Ethernet switch to interrupt the transmission of packets over the MII transmit bus, until either the expiration of a length of time specified in the pause message, or a subsequent 'terminate pause' message is received from the MII transmitter. A 'terminate pause' message is the same as a 'pause' message, except that the pause interval data field is set to zero. When the Ethernet switch interrupts its transmission of packets to the bridge module, the packet or packets that it would otherwise transmit to the bridge module buffer up inside of Ethernet Switch's 256 K buffer. Because of its relatively large storage capacity (256 Kbytes compared to the 6 Kbyte storage capacity of the bridge module's transmit buffer), the Ethernet's internal memory is readily able to handle packets that the switch would otherwise be transmitting to the bridge module during a maximum length pause interval.

The lower threshold of the data occupancy level of the Ethernet-T3 buffer is used by the bridge module's communications control logic to terminate an interruption of data flow from the Ethernet switch. Namely, once an interruption of the transmission of packets from the Ethernet switch to the bridge module takes place, data stored in the 6 K Ethernet-T3 buffer will continue to be clocked out by the T3 transmitter, but no new data will be received and written to the buffer by the MII receiver. (That data is temporarily buffered in the Ethernet switch's internal 256 Kbyte memory.) As data is clocked out of the Ethernet-T3 buffer, the contents of the Ethernet-T3 buffer eventually reach the lower threshold. When this happens, the bridge module's communications control logic causes the MII transmitter to transmit a 'terminate pause' packet, so that data flow from the Ethernet switch to the T3 network may resume.

Figure 2:
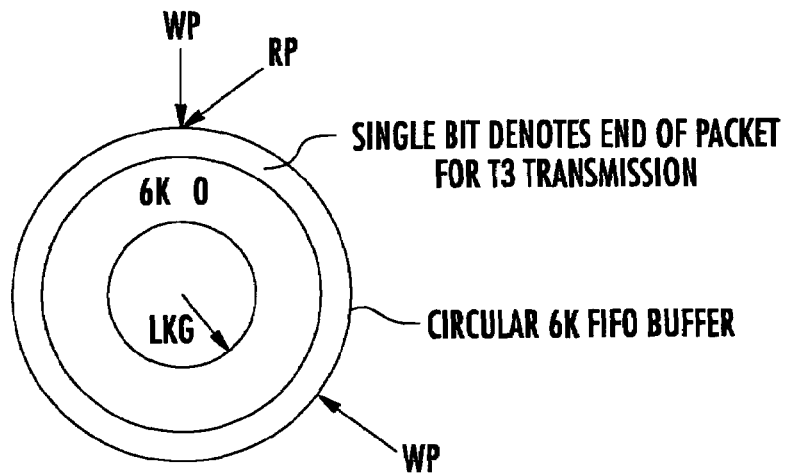
FIG. 2 diagrammatically represents the 'circular' aspect of a bridge module buffer.

The manner in which packets are written to and read out from the Ethernet LAN-T3 circular FIFO 6 K buffer will now be described with reference to FIG. 2, which diagrammatically represents the 'circular' or continuous aspect of the buffer for write and read operations with respect thereto. A write pointer WP points to that location in the buffer into which new data as received by the bridge module's MII receiver is being written (at a 100 MHz rate), while a read pointer (RP) points to that location in the buffer from which previously stored data is being clocked out (at a 44.736 MHz rate) for transmission by the bridge module's T3 transmitter. In addition, there is a 'last known good' (LKG) pointer, which points to the last byte of the most recently received complete packet. Because the write pointer is being incremented at a rate that is considerably higher than the read pointer, the read pointer is used to immediately clock out data as it is being received and written into the buffer by the MII receiver.

Moreover, since the write pointer is incremented at the 100 Mhz clock rate of the MII bus, which is more than twice the clock rate (44.736 Mbps) at which data is read out by the T3 transmitter, and because of the need to wait until completion of transmission of packets by the MII transmitter and the Ethernet switch before a pause message may be transmitted, the possibility (albeit a small one) exists for the write pointer to 'lap' the read pointer. If this were to happen, data of a previously stored packet that is yet to be read out would be overwritten by data of a newly received packet—a situation which would invalidate the packet being read out. To prevent this from happening, a 'last known good' (LKG) pointer is employed. As noted above, the LKG pointer points to the last byte of the most recently received complete packet. This pointer is used whenever the write pointer reaches the read pointer.

In this event, the write pointer is immediately backed up to the buffer address pointed to by the LKG pointer and the packet being written into the buffer is dropped (since it is only a partial packet and therefore invalid), with retransmission of the packet being handled by an upper layer data transport protocol. The read pointer (RP) will eventually point to the same address by the LKG pointer. Upon being incremented to the next address the read pointer will point to the first address of the next received packet, following the packet that was dropped.

Figure 3:
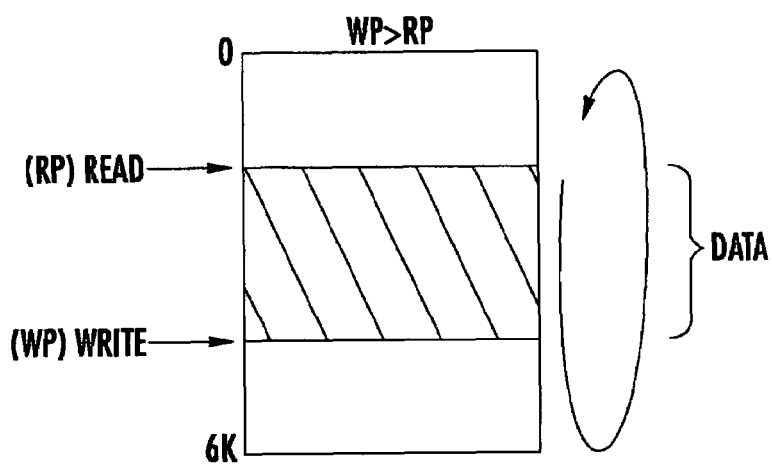
FIG. 3 shows a bridge module's Ethernet-T3 buffer storage condition where the address pointed to by the write pointer 'leads' the address pointed to by the read pointer, with the shaded area being the current contents of the buffer (yet to be read out)

The manner in which the upper (three-quarters) and lower (one-quarter) thresholds of the Ethernet-T3 buffer are determined depends upon the locations of the write and read pointers relative to one another. FIG. 3 shows the situation wherein the address pointed to by the write pointer (WP) 'leads' the address pointed to by the read pointer (RP), with the shaded area corresponding to the current contents of the buffer (yet to be read out). For this condition, the one-quarter full threshold is identified by comparing the difference between the addresses of the two pointers with a value equal to one-fourth the size of the FIFO which, in the example of the present embodiment is the value 1536. Namely, if WP>RP, then a one-quarter full flag is asserted (high) when (WP−RP) becomes greater than or equal to (FIFO size)/4. For the same condition, the three-quarter full threshold is identified by comparing the difference between the addresses of the two pointers with a value equal to three-fourths the size of the FIFO which, in the exemplary embodiment is the value 4608. Namely, if WP>RP, then a three-quarters full flag is asserted (high) when (WP−RP) is greater than or equal to 3(FIFO size)/4.

Figure 4:
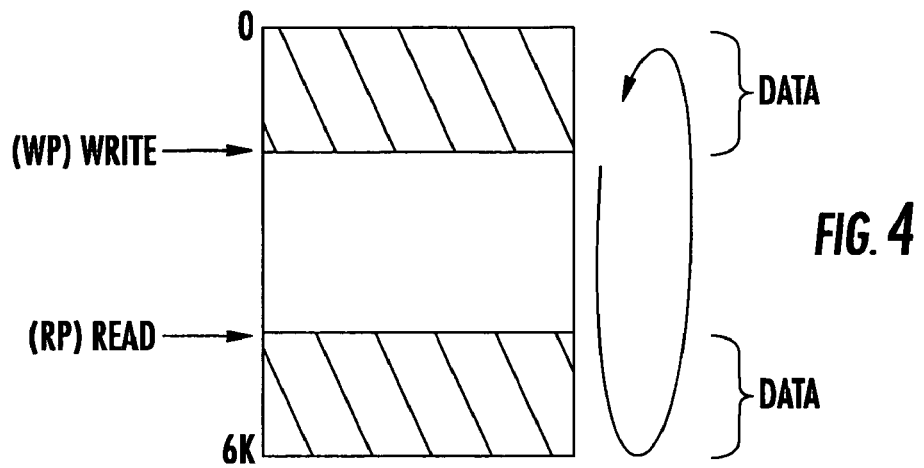
FIG. 4 shows a bridge module's Ethernet-T3 buffer storage condition where the address pointed to by the write pointer 'lags' the address pointed to by the read pointer (RP), with the shaded area corresponding to the current contents of the buffer yet to be read out.

FIG. 4 shows the situation, where the address pointed to by the write pointer (WP) 'lags' the address pointed to by the read pointer (RP), with the shaded area again corresponding to the current contents of the buffer yet to be read out. This condition will eventually occur due to the circular nature of the FIFO. For this condition, the one-quarter full threshold is identified by comparing the sum of the write pointer and the FIFO size, less the value of the read pointer, with a value equal to one-fourth the size of the FIFO. Namely, if WP<RP, then a one-quarter full flag is asserted (high) when (FIFO size−RP+WP) becomes greater than or equal to (FIFO size)/4. Similarly, a three-quarters full threshold is identified by comparing the sum of the write pointer and the FIFO size, less the value of the read pointer, with a value equal to three-fourths the size of the FIFO. Namely, if WP<RP, then a three-quarters full flag is asserted (high) when (FIFO size−RP+WP) becomes greater than or equal to 3(FIFO size)/4.

Where the value of the write pointer (WP) is equal to the value of the read pointer (RP), the FIFO is either empty or full. If WP=RP and a FIFO=empty flag is asserted true and a FIFO=full flag is not asserted, then the FIFO is empty, as such, the one-quarter full and the three-quarter flag are not asserted high. Where WP=RP and a FIFO=empty flag is asserted false and the FIFO=full flag is asserted true, then the FIFO is full, as such, the one-quarter full flag and the three-quarter full flag are asserted high. This may be represented by the following instruction set:

If((wp=rp) & (fifo_empty=true) & (fifo_full=false))

then

One-quarter-full=false;

Three-quarter-full=false;

Else If((wp=rp) & (fifo_empty=false) & (fifo_full=true))

then

Figure 5:
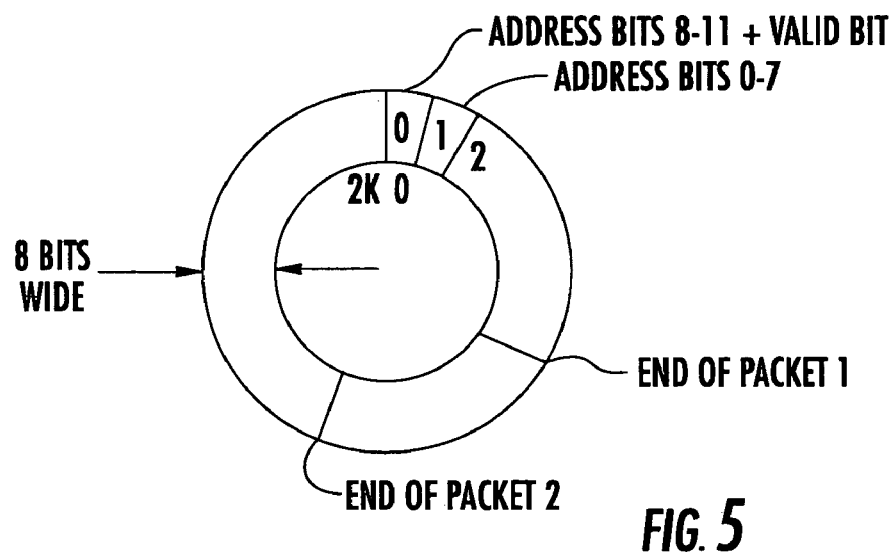
FIG. 5 diagrammatically represents the 'circular' or continuous aspect of a 2 K T3-Ethernet buffer for write and read operations.

One-quarter-full=true;

Three-quarter-full=true;

End if;

The manner in which packets are written to and read out from the T3-Ethernet circular FIFO 2 K buffer will now be described with reference to FIG. 5 which, similar to FIG. 2 for the 6 K buffer, diagrammatically represents the 'circular' or continuous aspect of the 2 K buffer for write and read operations with respect thereto. Because the T3 receiver receives packets from the T3 link at a clock rate (44.736 MHz) that is considerably slower than the (100 MHz) rate at which packets are read out of the T3-Ethernet 2 K buffer, the MII transmitter must wait until a complete packet is received and stored in the T3-Ethernet 2 K buffer, before it begins reading data out over the MII bus, in order to avoid a buffer underflow condition. The MII transmitter transmits one packet at a time, and once it begins transmission of a packet to the Ethernet switch, it is not interrupted.

Pursuant to the invention, the T3 receiver begins writing a packet into address location two, relative to the address of the last byte of the previous packet. For the case of an initially empty buffer, that address would correspond to address byte two, as shown in FIG. 5. Once a complete packet has been written into the buffer, the receiver writes the address of the last byte of the packet in the first two bytes of the received packet. For the initially empty case of FIG. 5, this corresponds to address locations zero and one. Address byte 1 is used to write the least significant eight bits (0-7) of the packet's eleven bit terminal byte address, while the four least significant bits of address byte 0 are used to stored bits 8-11 of the address. The most significant bit of address byte 0 is used as a valid bit and is set at one once a complete packet has been written into the buffer.

For a 2 K address space, the other bits of address byte zero are not used, don't care bits. The MII transmitter monitors the valid bit for the presence of a '1' and then proceeds to read out the packet beginning with the contents of byte two until the last byte the address of which is defined by the eight bits of address 1 and the four least significant bits of address 0, as described above. It then proceeds to monitor the valid bit of the equivalent 0th address bit for the next packet that has been written into the buffer.

Because of the bursty nature of the data on the T3 link, for clock synchronization purposes it is necessary to transmit 'dummy' data patterns between packets. These dummy data patterns are implemented by repetitively transmitting the flag byte pattern $7E_{HEX}$ or the code '0111 1110' between data packets. This serves to effectively encapsulate each data packet within a pair of flag packets. However, doing so creates the problem of distinguishing a flag byte from an actual data value having the flag byte pattern. This problem is resolved by stuffing a '0' bit after a run of five consecutive '1' bits in the data stream. Such a bit stuffing operation converts the flag byte pattern '0111 1110' to the pattern '0111 1101 0', thereby ensuring that flag patterns occur only where intended—outside the data stream. Since a standard IEEE 802.3 Ethernet Frame Starts with a 7 bytes of Preamble '$55_{HEX}$ and since we encapsulate a standard IEEE 802.3 Ethernet Frame with '$7E_{HEX}$ flag bytes, the invention uses this information to delineate start of an 802.3 Ethernet Frame. The invention denotes the end of the frame by looking for or transmitting, a minimum of 2 '$7E_{HEX}$ flag bytes.

As will be appreciated from the foregoing description, the previous inability to connect a T3 service with an Ethernet local area network, without using an expensive router employing high speed serial interface protocol, is effectively obviated by the differential time domain digital communication bridge module of the present invention, which takes advantage of the relatively large sized buffer within the Ethernet switch from which the packets are supplied, and is therefore able to employ a relatively small sized communication buffer in the Ethernet LAN-to-T3 direction without having packets dropped. By continuously comparing the storage occupancy of the limited capacity Ethernet-to-T3 buffer with an upper threshold equal to three-quarters of the 6 K storage capacity of the Ethernet-T3 FIFO buffer leaves enough overhead room in the buffer to capture a single maximum length packet from the Ethernet switch, so as to allow the Ethernet switch to complete its current transmission of a maximum length packet. Setting the lower threshold at one-quarter of the 6 K storage capacity of the Ethernet-T3 FIFO buffer provides sufficient memory to allow the T3 transmitter to read out the contents of the memory without underflow, as the Ethernet switch transmits the next packet to be buffered in the 6 K FIFO.

While we have shown and described a preferred embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of interfacing a data stream, transported from a data source over a first communication link at a first data rate, with a second communication link at a second data rate, less than said first data rate, comprising the steps of:
    (a) controllably writing said data stream as received from said first communication link into a data store having a first data storage capacity;
    (b) controllably reading said data stream out of said data store for transport over said second communication link at said second data rate;
    (c) in response to the amount of data in said data store being greater than a first prescribed fraction of the data storage capacity of said data store, causing said data source to interrupt transmission of said data stream over said first communication link and to store further data of said data stream in an associated storage buffer having a second data storage capacity greater than said first data storage capacity; and
    wherein the data store has a buffer size operative with the data source to accommodate the time required to complete clocking out of a stored maximum length packet of a clock rate of the second communication link; the completion of a transmission in progress of a maximum length packet by the first communication link before a pause packet is transmitted; and completion of a transmission in progress of a packet from the first communication link to the storage in the second communication link.

2. The method according to claim 1, further comprising the step of:
    (d) in response to the amount of data in said data store being no greater than a second prescribed fraction, less than said first prescribed fraction, of the data storage capacity of said data store, causing said data source to read out said further data from said associated storage buffer and to transmit said further data over said first communication link for storage in said data store.

3. The method according to claim 2, wherein step (b) comprises transmitting, over said first communication link to said data source, a message that is effective to cause said data source to interrupt transmission of said data stream over said first communication link and to store said further data of said data stream in said associated storage buffer.

4. The method according to claim 2, wherein said data stream comprises a data packet having a prescribed maximum length.

5. The method according to claim 4, wherein said data store has a storage capacity about four times said prescribed maximum length of a data packet.

6. The method according to claim 5, wherein said first prescribed fraction is about three-fourths of the data storage capacity of said data store.

7. The method according to claim 5, wherein said second prescribed fraction about one-fourth of the data storage capacity of said data store.

8. An apparatus for interfacing a data stream, transported from a data source over a first communication link at a first data rate, with a second communication link at a second data rate, less than said first data rate, comprising:
    a first data store having a first data storage capacity;
    a first receiver that is adapted to be coupled to said first communication link, and being operative to controllably write said data stream as received from said first communication link into said first data store;
    a first transmitter that is adapted to be coupled to said second communication link, and being operative to controllably read said data stream out of said first data store for transport over said second communication link at said second data rate;

a second transmitter that is adapted to be coupled to said first communication link, and being operative, in response to the amount of data in said first data store being greater than a first prescribed fraction of the data storage capacity of said first data store, to transmit a first message over said first communication link that is effective cause said data source to interrupt transmission of said data stream over said first communication link and to store further data of said data stream in an associated second data store having a second data storage capacity greater than said first data storage capacity; and wherein the data store has a buffer size operative with the data source to accommodate the time required to complete clocking out of a stored maximum length packet of a clock rate of the second communication link; the completion of a transmission in progress of a maximum length packet by the first communication link before a pause packet is transmitted; and completion of a transmission in progress of a packet from the first communication link to the storage in the second communication link.

9. The apparatus according to claim 8, wherein said second transmitter is operative, in response to the amount of data in said first data store being no greater than a second prescribed fraction, less than said first prescribed fraction, of the data storage capacity of said first data store, to transmit a second message over said first communication link to said data source, that is effective to cause said data source to read out said further data from said second data store and to transmit said further data over said first communication link for storage in said first data store.

10. The apparatus according to claim 9, wherein said data stream comprises a data packet having a prescribed maximum length.

11. The apparatus according to claim 10, wherein said first data store has a storage capacity about four times said prescribed maximum length of a data packet.

12. The apparatus according to claim 11, wherein said first prescribed fraction is about three-fourths of the data storage capacity of said first data store.

13. The apparatus according to claim 12, wherein said second prescribed fraction is about one-fourth of the data storage capacity of said first data store.

14. The apparatus according to claim 8, further comprising:

a third data store having a third data storage capacity less than said first data storage capacity; and a second receiver that is adapted to be coupled to said second communication link, and being operative to controllably write data, as received from said second communication link at said second data rate, into said third data store; and wherein said second transmitter is operative to controllably read data out of said second data store for transport over said first communication link at said first data rate.

\* \* \* \* \*